United States Patent
Sasso et al.

(10) Patent No.: US 9,346,697 B2
(45) Date of Patent: May 24, 2016

(54) MOULD-SUPPORTING SYSTEM FOR A MACHINE FOR FORMING HOLLOW GLASSWARE

(71) Applicant: BDF HOLDINGS S.p.A., Vicenza (VI) (IT)

(72) Inventors: Daniele Sasso, Tesido di Monguelfo (IT); Marco Gennari, Vicenza (IT)

(73) Assignee: BDF HOLDING S.p.A., Vicenza (IT)

( * ) Notice: Subject to any disclaimer, the term of this patent is extended or adjusted under 35 U.S.C. 154(b) by 27 days.

(21) Appl. No.: 14/486,748

(22) Filed: Sep. 15, 2014

(65) Prior Publication Data

US 2015/0075225 A1 Mar. 19, 2015

(30) Foreign Application Priority Data

Sep. 13, 2013 (EP) .................................... 13184241

(51) Int. Cl.
| | |
|---|---|
| *C03B 9/40* | (2006.01) |
| *C03B 11/16* | (2006.01) |
| *C03B 9/353* | (2006.01) |

(52) U.S. Cl.
CPC ............... *C03B 11/16* (2013.01); *C03B 9/3537* (2013.01); *C03B 9/40* (2013.01); *C03B 2215/50* (2013.01); *C03B 2215/70* (2013.01)

(58) Field of Classification Search
CPC ................................. C03B 9/353; C03B 11/16
USPC .................................................... 65/359, 361
See application file for complete search history.

(56) References Cited

U.S. PATENT DOCUMENTS

| | | | | | |
|---|---|---|---|---|---|
| 3,251,673 | A | * | 5/1966 | Brymer, Jr. ............ | C03B 9/3537 65/323 |
| 4,009,018 | A | * | 2/1977 | Nebelung ............. | C03B 9/3875 65/229 |
| 4,070,174 | A | | 1/1978 | Nebelung et al. | |
| 4,576,624 | A | * | 3/1986 | Seidel ....................... | C03B 9/28 65/240 |
| 4,770,687 | A | * | 9/1988 | Nebelung ............. | C03B 9/3537 65/357 |
| 4,978,380 | A | * | 12/1990 | Nebelung ............. | C03B 9/1932 249/167 |

(Continued)

OTHER PUBLICATIONS

European Search Report for corresponding European Patent Application No. 13184241.1 dated Mar. 24, 2014.

*Primary Examiner* — Russell Kemmerle, III (74) *Attorney, Agent, or Firm* — Heslin Rothenberg Farley & Mesiti P.C.; Victor A. Cardona, Esq.

(57) ABSTRACT

A mould-supporting system for a machine for forming hollow glassware includes a supporting structure, and a first carriage and a second carriage, which are slidably mounted, respectively, on a first bar and a second bar of the supporting structure, and, moreover, are slidably mounted on a third bar of the supporting structure, common to the two carriages, the first and second carriages carrying, respectively, a first mould-carrier arm and a second mould-carrier arm. Mutual displacement of the first and second carriages is controlled between a position where they are set close to one another and a corresponding position where they are set apart. The first and second carriages have a first tubular portion that engages, respectively, the first and second bars via first sliding means, and a second tubular portion that engages the third bar via second sliding means. The second sliding means enable adjustment of the position of the second tubular portion in a direction transverse to the third bar.

15 Claims, 7 Drawing Sheets

(56) References Cited

U.S. PATENT DOCUMENTS

| | | | | |
|---|---|---|---|---|
| 5,252,114 A | * | 10/1993 | Sidler | C03B 9/3537 65/229 |
| 5,275,638 A | * | 1/1994 | Sidler | C03B 9/3537 65/359 |
| 5,569,313 A | * | 10/1996 | Meyer | C03B 9/3537 65/357 |
| 5,578,105 A | * | 11/1996 | Meyer | C03B 9/3537 65/359 |
| 2015/0075226 A1 | * | 3/2015 | Sasso | C03B 9/40 65/361 |

* cited by examiner

MOULD-SUPPORTING SYSTEM FOR A MACHINE FOR FORMING HOLLOW GLASSWARE

CROSS-REFERENCE TO RELATED APPLICATIONS

This application claims priority to European Patent Application No. 13184241.1 filed on Sep. 13, 2013, the entire disclosure of which is incorporated herein by reference in its entirety.

This application contains subject matter which is related to the subject matter of co-owned U.S. Ser. No. 14/486,841, filed concurrently herewith, entitled "MOULD-SUPPORTING SYSTEM FOR A MACHINE FOR FORMING HOLLOW GLASSWARE", the entire disclosure of which is incorporated herein by reference in its entirety

BACKGROUND OF THE INVENTION

The present invention relates in general to the field of machines for forming hollow glassware. The invention regards, more in particular, a mould-supporting system for a machine of the type specified above. Still more in particular, the invention regards a mould-supporting system for a machine for forming hollow glassware, comprising:
  a supporting structure;
  a first carriage and a second carriage, which are slidably mounted, respectively, on a first bar and a second bar of said supporting structure, and, moreover, are slidably mounted on a third bar of said supporting structure, common to the two carriages, said first and second carriages carrying, respectively, a first mould-carrier arm and a second mould-carrier arm; and
  means for controlling mutual displacement of said first and second carriages between a position where they are set close to one another and a corresponding position where they are set apart,
  wherein said first and second carriages comprise a first tubular portion that engages, respectively, said first and second bars via first sliding means, and a second tubular portion that engages said third bar via second sliding means.

A mould-supporting system of the type indicated above is, for example, described in the U.S. Pat. No. 4,009,018.

SUMMARY OF THE INVENTION

The object of the present invention is to provide a system of the type specified above that will be improved, in particular that will be able to guarantee an alignment that is precise and stable over time of the moulds, for a relatively long life cycle (for example, above 50 million cycles), and during operation of the machine at high machining speed (above 15 cycles per minute).

The object referred to above is achieved via a system presenting the characteristics indicated in the claims.

The claims form an integral part of the technical teaching provided herein in relation to the invention.

BRIEF DESCRIPTION OF THE DRAWINGS

Further characteristics and advantages of the invention will emerge clearly from the ensuing description with reference to the annexed drawings, which are provided purely by way of non-limiting example and in which.

DETAILED DESCRIPTION OF THE INVENTION

In the ensuing description, various specific details are illustrated aimed at an in-depth understanding of the embodiments. The embodiments may be provided without one or more of the specific details, or with other methods, components, or materials, etc. In other cases, known structures, materials, or operations are not shown or described in detail so that various aspects of the embodiment will not be obscured.

The references used herein are only provided for convenience and hence do not define the sphere of protection or the scope of the embodiments.

With reference to the figures, designated as a whole by the reference number 10 is a mould-supporting system of a machine for forming hollow glassware. The system in question can be used for supporting both the blank moulds and the blow moulds of the forming machine.

In various embodiments, as in the one illustrated, the system 10 comprises a supporting structure 12, presenting three sliding bars 14, 16, 18, parallel to one another and supported by one and the same pair of opposed plates 22 of the supporting structure 12. The bars 14, 16, 18 are mutually arranged in such a way that their corresponding opposite ends will occupy the vertices of an imaginary triangle contained in a plane parallel to the plates 22.

The system 10 comprises a first carriage 2 and a second carriage 4, which engage, two by two, the three bars 14, 16, and 18. In particular, the carriage 2 is slidably mounted on the bars 14 and 18, whereas the carriage 4 is slidably mounted on the bars 16 and 18.

The carriages 2 and 4 carry the mould-carrier arms 6 and 8, connected thereto in a removable way via means of a known type (for example, fixing screws and alignment cams).

Figure 1:
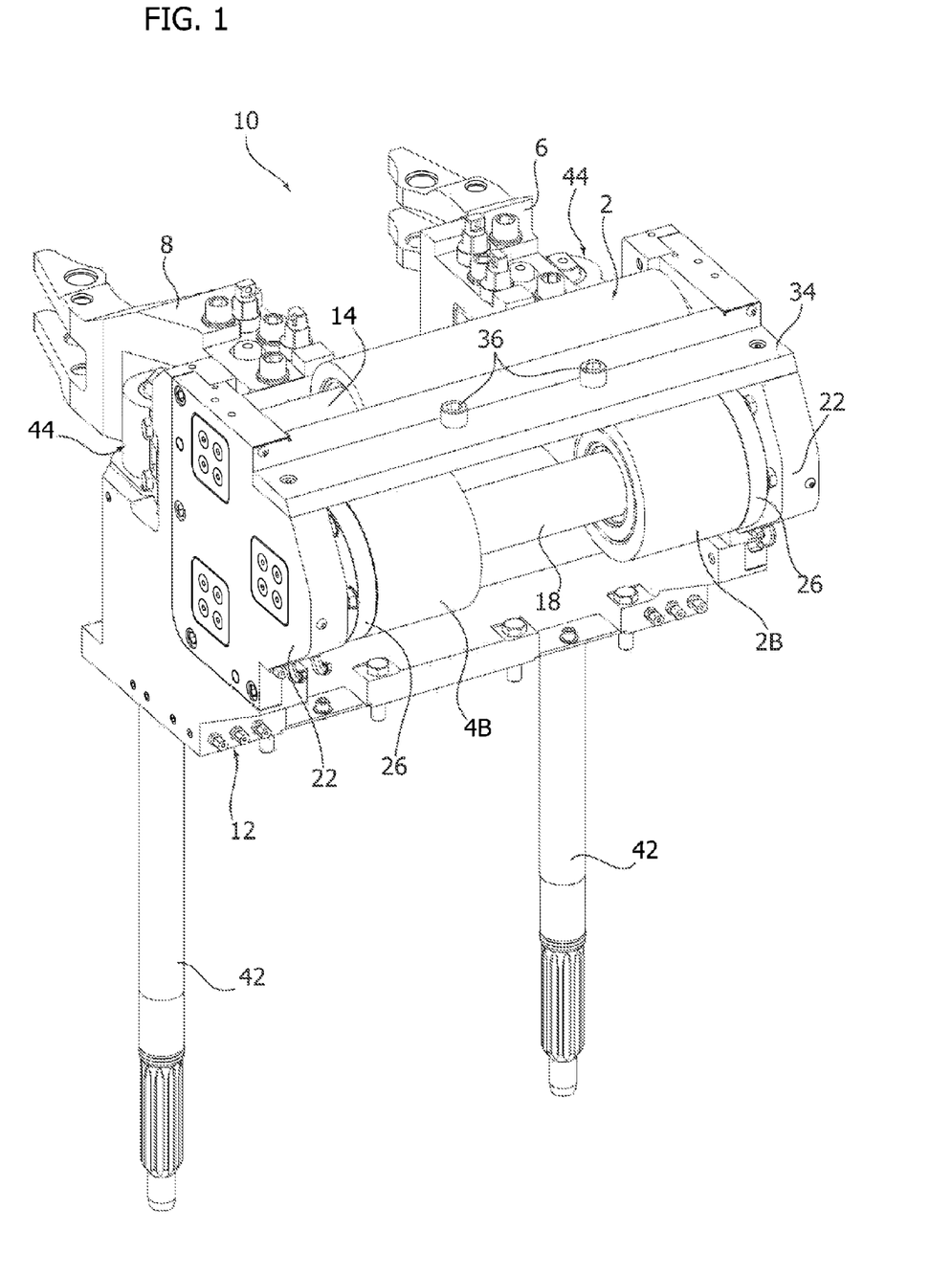
FIG. 1 is a rear perspective view of an embodiment of the system described herein.
Figure 2:
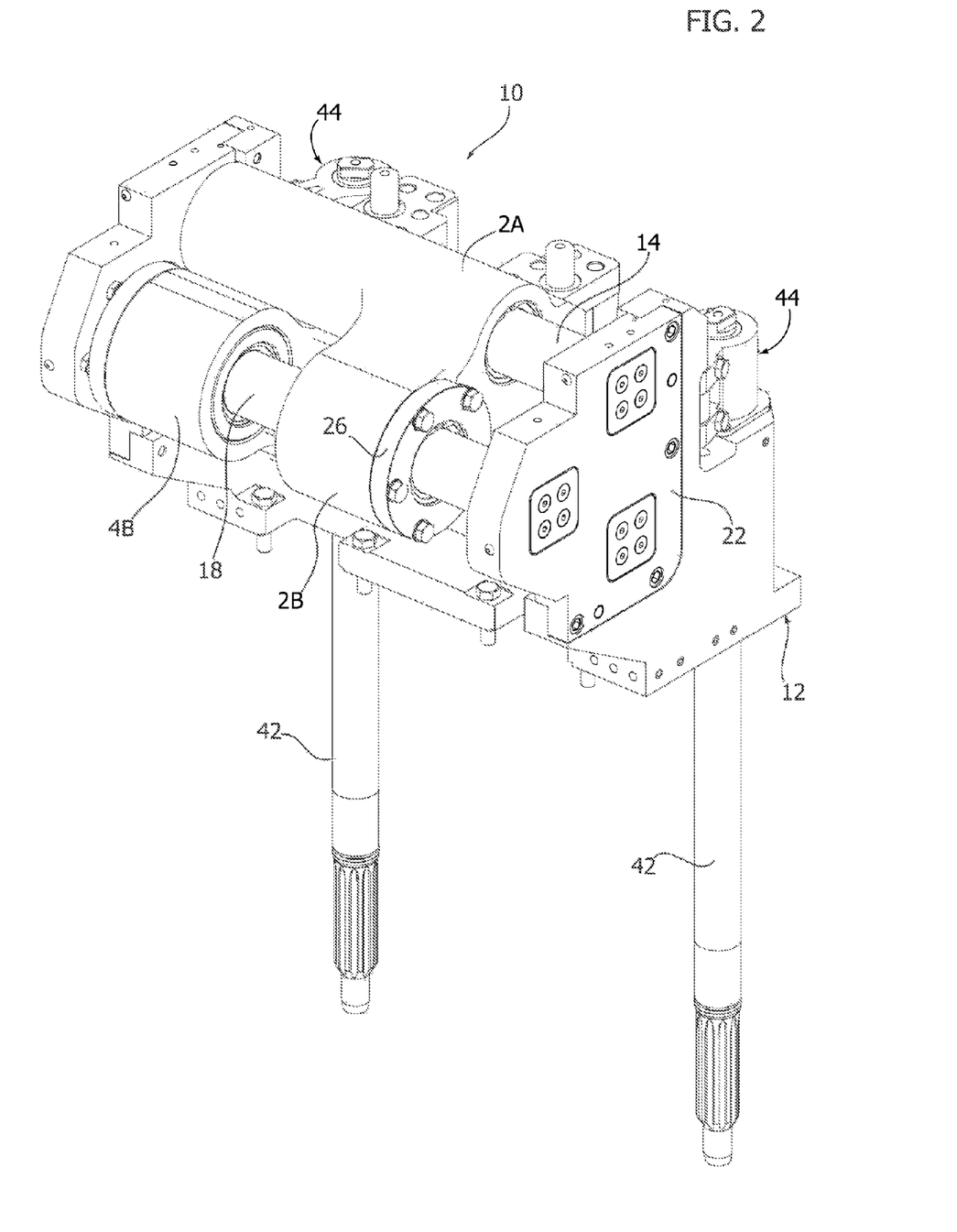
FIG. 2 is a rear perspective view, from a different angle, of the system of FIG. 1 in which the mould-carrier arms have been removed.
Figure 3:
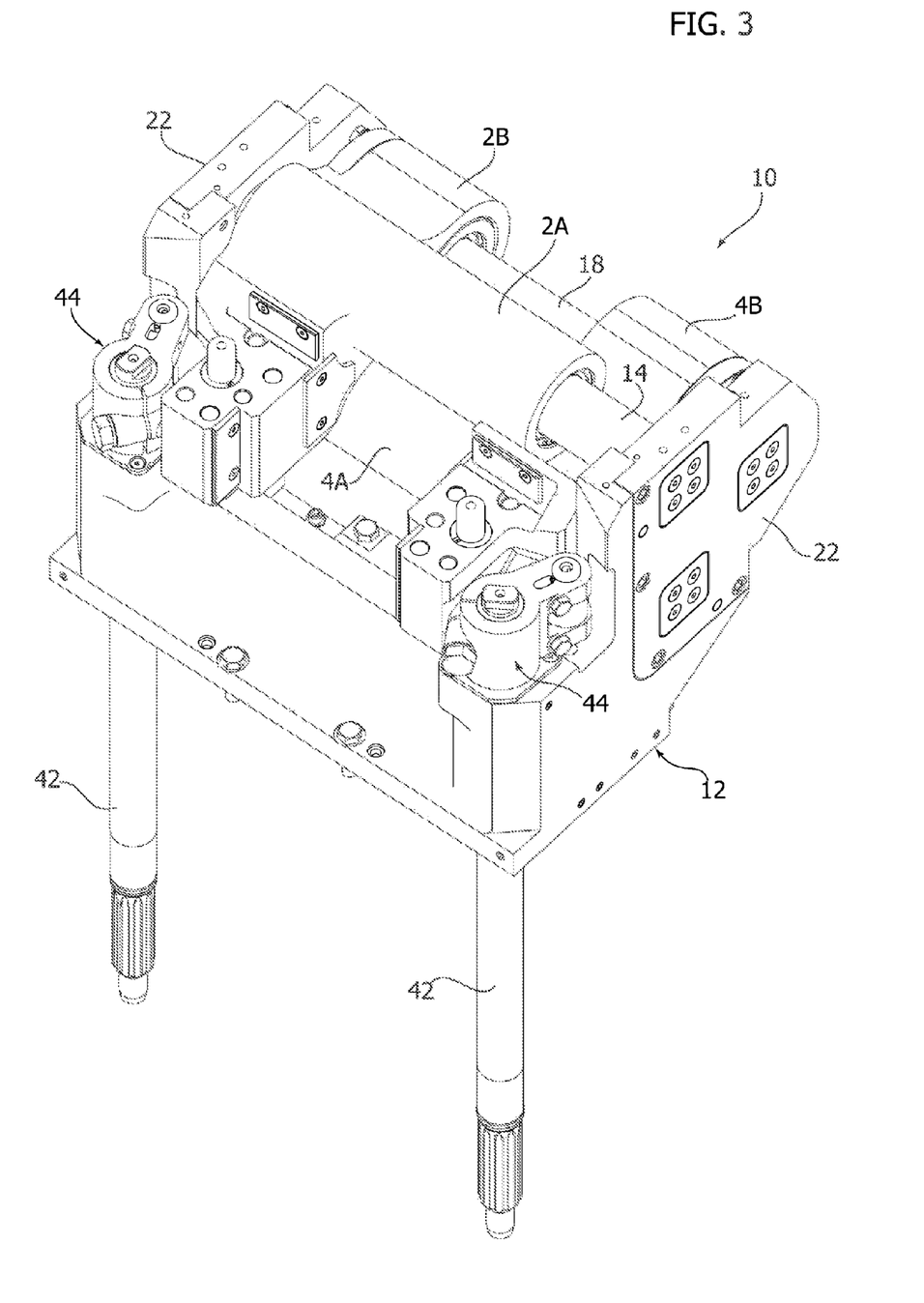
FIG. 3 is a front perspective view of the system of FIG. 2.

The system 10 comprises means for controlling mutual displacement of the carriages 2 and 4 between a position where they are set close to one another (not illustrated), and a corresponding position where they are set apart (visible in FIG. 1). As may be noted, in the position where the carriages are set close to one another, the moulds of the arms 6 and 8 carried thereby are coupled together in a closed configuration, to constitute the mould cavity within which the hollow glassware is formed.

It should be noted that the aforesaid control means may be of any type already known in the technical field in question. In the embodiment illustrated in the figures, these means have, for each carriage, a shaft 42 with vertical axis, coupled, at its top ends, to a crank mechanism 44, connected to the carriage and designed to convert the motion of rotation of the shaft into a reciprocating rectilinear motion of the carriage.

In various embodiments, as in the one illustrated, the first carriage has a first tubular portion 2A and a second tubular portion 2B, which are rigidly connected together and are slidably mounted on the bar 14 and on the bar 18, respectively. Likewise, the second carriage 4 has a first tubular portion 4A and a second tubular portion 4B, which are rigidly connected together and are slidably mounted on the sliding bars 16 and 18.

As will be seen in detail, the two bars 14 and 16 have the main function of supporting the weight and inertia of the carriages 2 and 4. They have respective central sliding portions 14A, 16A, along which the two carriages, which have a substantially cylindrical shape, slide. The tubular portions 2A, 4A of the two carriages, mounted on them, have a corresponding shape and have a function of supporting and stabilizing the carriage; for this purpose, they extend in length by a value that exceeds half the length of the two portions 14A, 16A.

The tubular portions 2A and 4A engage the portions 14A, 16A via sliding means configured for aligning the geometrical axis of the tubular portion with that of the corresponding portion of bar and to enable sliding of said portion on the bar itself. In various embodiments, as in the one illustrated, said sliding means are constituted by a pair of bushings 24, mounted within the tubular portion, at its opposite end regions, and axially constrained thereto, according to modalities of a known type. This type of engagement of the portions 2A, 4A means that also these are rotatable with respect to the bars 14, 16.

The bar 18 has, instead, an anti-rotation function, i.e., the function of defining the angular position of each carriage around its main sliding bar. In various preferred embodiments, as in the one illustrated, the bar 18 also has a central sliding portion, designated by the reference 18A, which has a substantially cylindrical shape.

The tubular portions 2B, 4B of the two carriages engage the portion 18A via sliding means configured for enabling the above portions to move freely, within a limited range, in a direction transverse to the bar 18. These sliding means are, moreover, provided with blocking members, for fixing the tubular portion in a pre-set position in the aforesaid transverse direction. It should be noted that the range of displacement of the tubular portions 2B, 4B with respect to the bar 18 may even be of the order of millimeters, for example one millimeter.

As will be seen in detail in what follows, the above sliding means hence enable adjustment of the angular positions of the two carriages around their respective main sliding bars, varying the position of the tubular portions 2B, 4B of the carriages, with respect to the bar 18, in a plane transverse to the longitudinal direction thereof. Via adjustment of the angular positions in question of the carriages it is possible to define the inclination of the mould-carrier arms mounted thereon, and hence enable alignment of the moulds of the machine.

Examples of embodiment of the above means will now be described with reference to the carriage 4, but it is clear that the teachings provided herein apply also to the sliding means associated to the carriage 2.

Figure 6A:
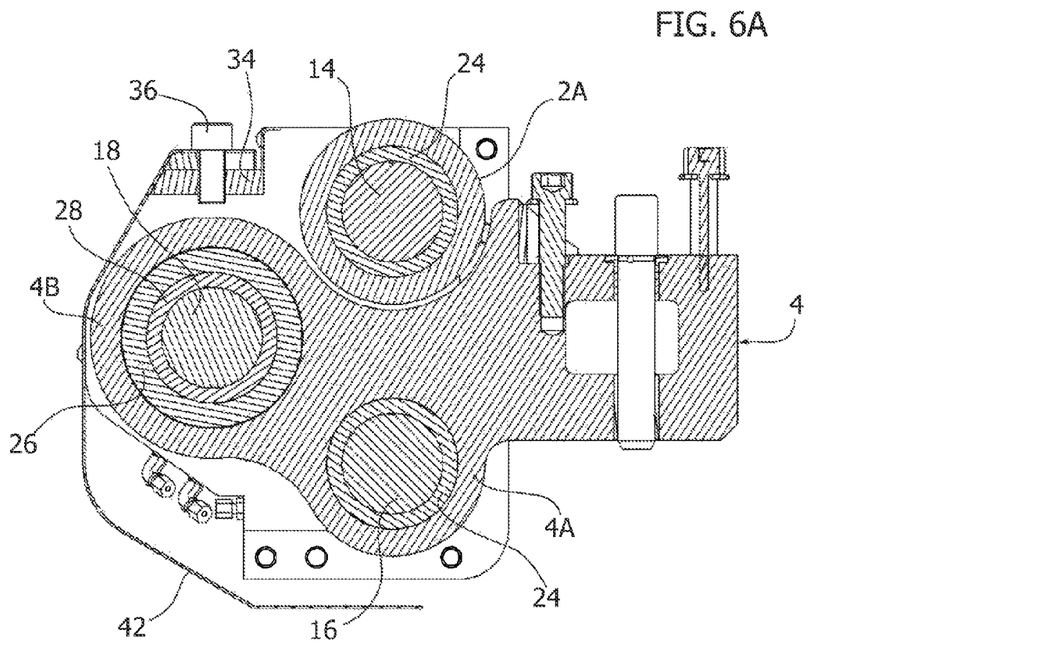
FIGS. 6A and 6B are two cross-sectional views according to the plane VI-VI of FIG. 5, in which a carriage of the system is shown in two different positions.

In various embodiments, as in the one illustrated (see in particular FIGS. 6A, 6B and 7), the above sliding means comprise a tubular element 26 that fits into the tubular portion 4B, and a bushing 28, set within the element 26 and slidably engaging the bar 18. The bushing 28 is axially anchored to the tubular element 26 according to modalities of a known type.

Figure 6B:
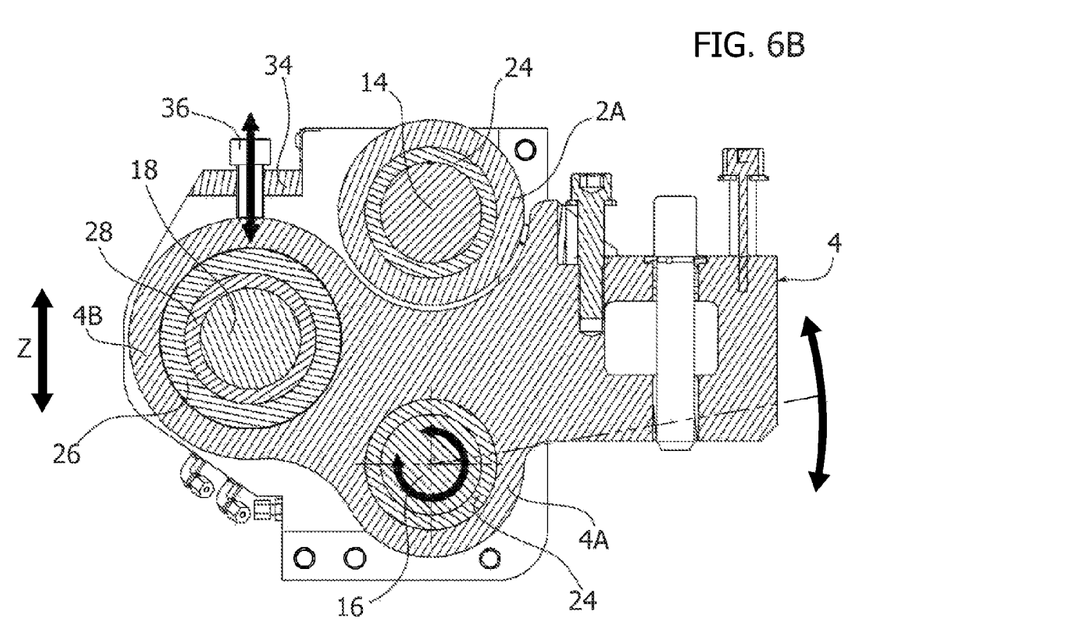
Figure 7:
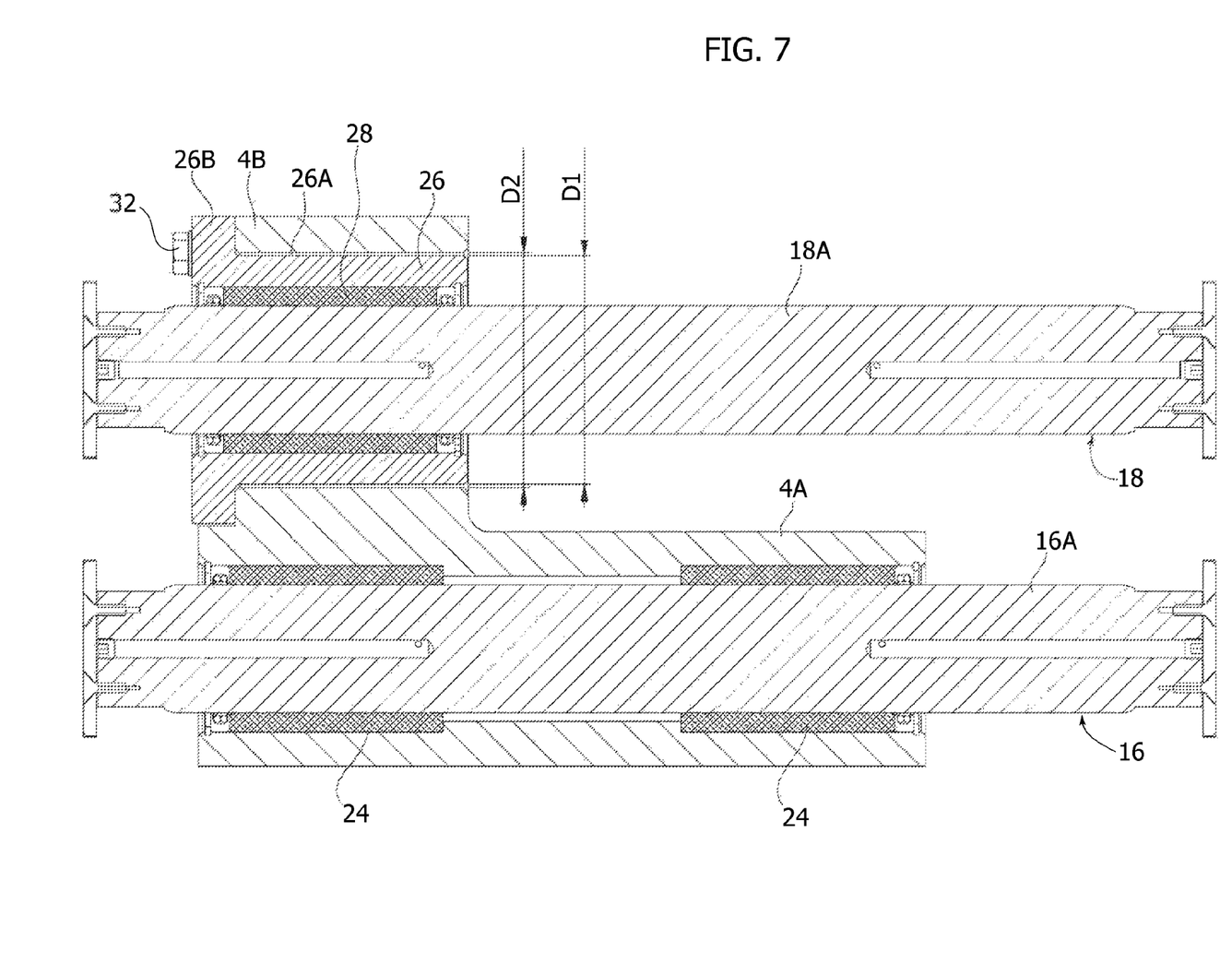
FIG. 7 is a cross-sectional view of a carriage of the system according to a plane of section that traverses the carriage and its two corresponding sliding bars.

The tubular element 26 has a cylindrical outer surface 26A of a diameter smaller than the diameter of the internal cavity, which is also cylindrical, of the tubular portion 4B, in order to enable a relative displacement thereof with respect to the element 26 and to the bar 18, in a plane orthogonal to the longitudinal direction of the bar. The difference between the diameter of the surface 26A (designated by D1 in FIG. 7) and the diameter of the internal cavity of the tubular portion 4B (designated by D2 in FIG. 7) defines the range within which the latter can be displaced with respect to the bar 18. As schematically represented in FIG. 6B, the above displacement causes a rotation of the carriage 4 around the main sliding bar 16.

Moreover, the tubular element 26 has a radial end flange 26B, which is set against one end of the tubular portion 4B and has fixing members that are designed to engage this portion so as to fix it in position on the tubular element. In various embodiments, as in the one illustrated, these members are constituted by screws 32 that engage corresponding threaded holes (not illustrated) made on the flange 26B and on the end of the tubular portion 4B.

Intervention on the sliding means in question to vary the angular position of the carriage 4 hence envisages unscrewing of the screws 32 so as to release the portion 4B from the element 26, and displacing the latter portion, in a direction transverse to the bar 18, as far as a position to which there corresponds the desired angular position of the carriage.

As mentioned above, the sliding means of the carriage 2 and their mode of operation on the portion 2B thereof also correspond to the ones just described.

Figure 4:
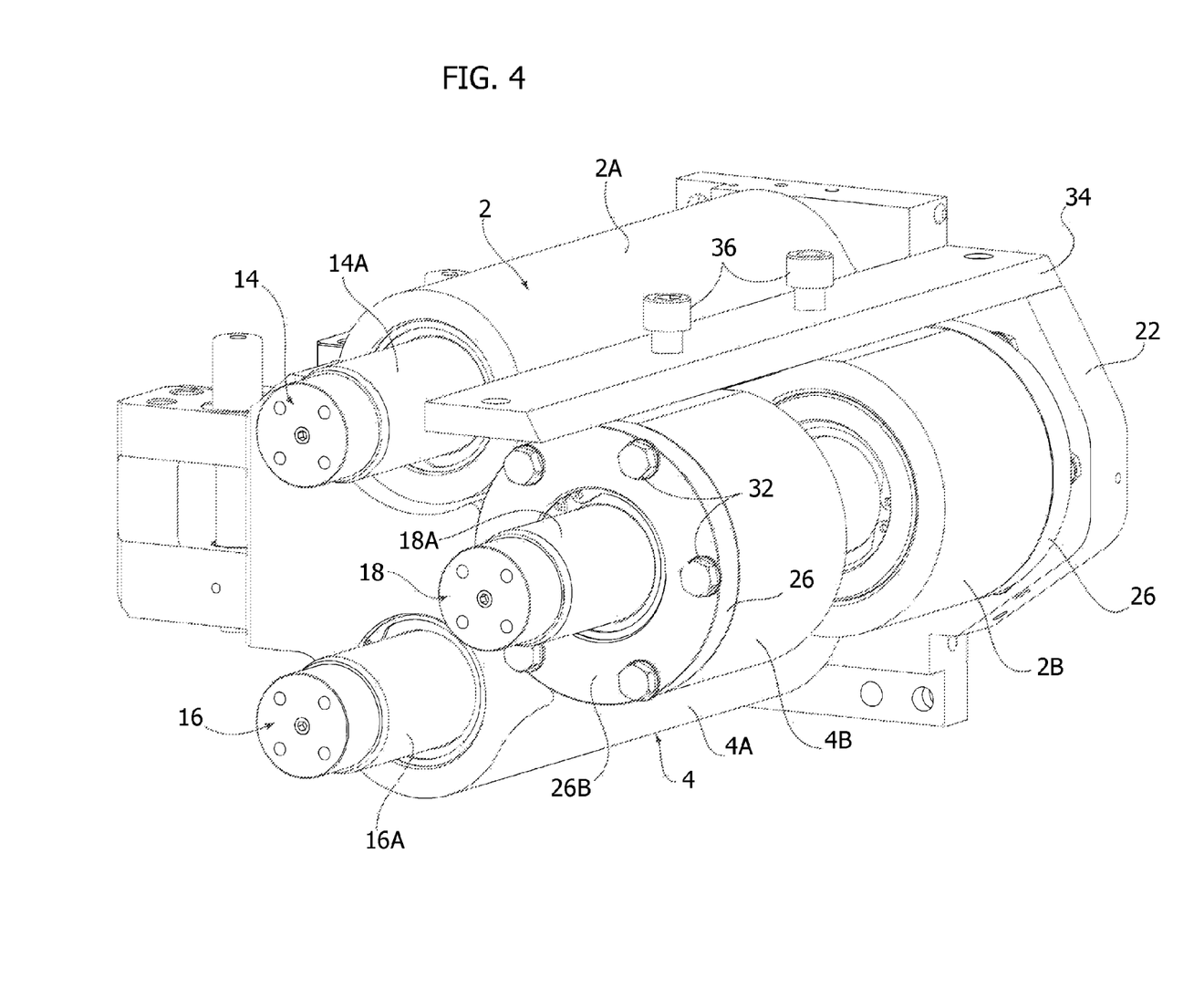
FIG. 4 is a perspective view of the carriage-supporting unit partially dismantled.
Figure 5:
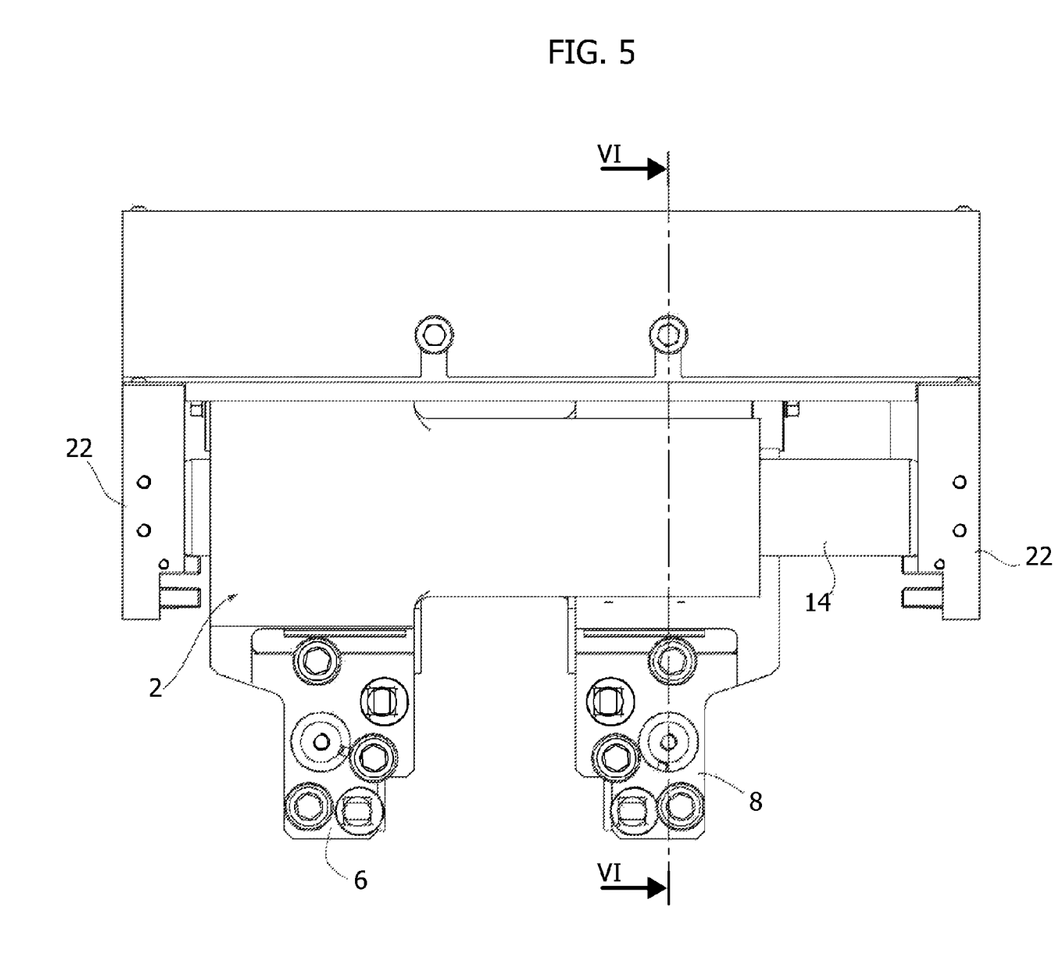
FIG. 5 is a top plan view of the system of FIG. 2.

In various embodiments, as in the one illustrated (see, in particular, FIGS. 4, 6A and 6B), the system further comprises means that are designed to facilitate precise positioning of the respective portions 2B, 4B of the two carriages on the bar 18. In particular, the supporting structure 12 comprises a beam 34 parallel to the sliding bars, and supported at the opposite ends by the walls 22, carried on which are threaded adjustment means that are designed to engage the outer surface of the tubular portions 2B, 4B in order to vary the position of the latter with respect to the element 26. In various embodiments, as in the one illustrated, the above means are constituted by simple screws 36 that engage corresponding threaded holes made in the beam 34. In the condition where these screws are in contact with the outer surfaces of the portions 2B and 4B (FIG. 6B), by screwing them it is possible to push said portions, in a controlled way, in the vertical direction Z, as far as the desired position. A protective shield 42 may be arranged on the rear side of the system so as to prevent, in its mounted condition, any action of the screws 36 against the portions 2B and 4B of the carriages. Clearly, adjustment of the position of the carriages must in fact be carried out with the machine stationary. In various preferred embodiments, the screws 36 are arranged along the beam 34 in positions such that they can act on the portions 2B, 4B when the respective carriages are in the position where they are set close to one another.

As emerges from the above description, in the system described herein the position of the carriages can hence be adjusted in a simple and fast way by acting on the sliding means with which each carriage engages the anti-rotation bar 18. This facilitates first of all the operations of installation of the carriages on the machine, and moreover makes it possible to recover, in a way that is equally simple and fast, any possible misalignments due to wear of the mutually sliding parts, redefining the positions determined by the sliding means in question.

Finally, it should be noted that in the system described herein the plates 22, on which the sliding bars and the carriages carried thereby are mounted, are connected to a base frame of the supporting structure 12 in a removable way so that the entire carriage-supporting unit can be easily dismantled and replaced. The plates 22 are coupled to the base frame via positioning and fixing means that are designed to ensure a firm and precise connection.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

The invention claimed is:

1. A mould-supporting system for a machine for forming hollow glassware, comprising:
   a supporting structure;
   a first carriage and a second carriage, which are slidably mounted, respectively, on a first bar and a second bar of said supporting structure, and, are slidably mounted on a third bar of said supporting structure, common to the two carriages, said first and second carriages carrying, respectively, a first mould-carrier arm and a second mould-carrier arm; and
   means for controlling mutual displacement of said first and second carriages between a position where they are set close to one another and a corresponding position where they are set apart,
   wherein said first and second carriages comprise a first tubular portion that engages, respectively, said first and second bars via first sliding means, and a second tubular portion that engages said third bar via second sliding means,
   said second sliding means are configured for enabling said second tubular portion to move freely, within a limited range, in a direction transverse to said third bar, and said sliding means provided with at least one blocking member designed to fix said second portion in a pre-set position in said transverse direction.

2. The system according to claim 1, wherein said second sliding means comprise, in association to said second portion, a tubular element that fits into said second portion, and a bushing, set within said element and slidably engaging said third bar, wherein said tubular element has a cylindrical outer surface of a diameter smaller than the diameter of the internal cavity of said second tubular portion.

3. The system according to claim 2, wherein said tubular element has a radial end flange, which is set against one end of said second tubular portion and has fixing members that are designed to engage said second portion for fixing it in position on said element.

4. The system according to claim 2, wherein said supporting structure comprises a beam parallel to said sliding bars, carried on which are threaded means that are designed to engage the outer surface of said second tubular portion of said first and second carriages in order to vary the position thereof with respect to said third sliding bar in said direction transverse to said third bar.

5. The system according to claim 2, wherein said bars are carried, at the opposite ends, by opposed plates removably connected to a base frame of said supporting structure.

6. The system according to claim 3, wherein said members are constituted by screws that engage corresponding threaded holes made in said flange and in said end of said second tubular portion.

7. The system according to claim 3, wherein said supporting structure comprises a beam parallel to said sliding bars, carried on which are threaded means that are designed to engage the outer surface of said second tubular portion of said first and second carriages in order to vary the position thereof with respect to said third sliding bar in said direction transverse to said third bar.

8. The system according to claim 3, wherein said bars are carried, at the opposite ends, by opposed plates removably connected to a base frame of said supporting structure.

9. The system according to claim 6, wherein said supporting structure comprises a beam parallel to said sliding bars, carried on which are threaded means that are designed to engage the outer surface of said second tubular portion of said first and second carriages in order to vary the position thereof with respect to said third sliding bar in said direction transverse to said third bar.

10. The system according to claim 6, wherein said bars are carried, at the opposite ends, by opposed plates removably connected to a base frame of said supporting structure.

11. The system according to claim 1, wherein said supporting structure comprises a beam parallel to said sliding bars, carried on which are threaded means that are designed to engage the outer surface of said second tubular portion of said first and second carriages in order to vary the position thereof with respect to said third sliding bar in said direction transverse to said third bar.

12. The system according to claim 11, wherein said means comprise screws that engage corresponding threaded holes made in said beam.

13. The system according to claim 11, wherein said bars are carried, at the opposite ends, by opposed plates removably connected to a base frame of said supporting structure.

14. The system according to claim 12, wherein said bars are carried, at the opposite ends, by opposed plates removably connected to a base frame of said supporting structure.

15. The system according to claim 1, wherein said bars are carried, at the opposite ends, by opposed plates removably connected to a base frame of said supporting structure.

* * * * *